April 21, 1959 M. B. DOBRIN 2,882,988
ELIMINATION OF NEAR SURFACE REFLECTION EFFECTS
Filed March 16, 1953

MILTON B. DOBRIN
INVENTOR.

BY D. Carl Richards
ATTORNEY

United States Patent Office 2,882,988
Patented Apr. 21, 1959

2,882,988

ELIMINATION OF NEAR SURFACE REFLECTION EFFECTS

Milton B. Dobrin, Dallas, Tex., assignor, by mesne assignments, to Socony Mobil Oil Company, Inc., a corporation of New York Application March 16, 1953, Serial No. 342,604

11 Claims. (Cl. 181—.5)

This invention relates to seismic exploration and more particularly to the production of records of seismic energy unmasked by near shot reflections.

In seismic exploration an explosive charge is detonated at a near surface point, preferably below the weathered layer, to initiate seismic waves which travel to subsurface interfaces where they are reflected back to the earth's surface and are detected and recorded. Since the charge is usually exploded a short distance below the base of the weathered layer, a substantial amount of the energy travelling upward from the explosive charge is reflected. Such energy experiences phase reversal and then travels to deep reflecting interfaces. In some instances other reflecting interfaces lie above the shot and cause downward reflection of some of the energy traveling upward from the shot. At a surface detecting station energy reflected from the base of the weathering or other velocity discontinuities above the shot may form a substantial part of the total energy comprising a "reflection" and often unduly complicates the wave patterns, distorting the reflection from the deep subsurface interfaces. The nature of this distortion varies when the depth of the shot below the near surface interface varies, so that the character of the reflections used for subsurface mapping will vary with shot depth. "Shot point variable," as this effect is called, often makes it difficult to correlate reflections from adjacent holes and results in great uncertainty in the interpretation of seismic reflection data.

It is an object of the present invention to eliminate certain unwanted components of the waves detected at the earth's surface. It is a further object of the present invention to provide a means and a method for producing seismic records of relatively simple character in which the reflection characteristics are governed only by the elastic properties of the deep reflecting interfaces. Such records would be more readily subject to interpretation than otherwise is possible.

In accordance with the present invention, shot point variables encountered in seismic exploration are substantially reduced by producing a first time variable function representative of seismic waves appearing at the earth's surface due to the combination of a first energy component traveling downwardly from the point of detonation of an explosive charge to a subterranean reflecting interface and a second energy component reflected downwardly to said subterranean interface from a near surface reflecting interface and producing a second time variable function of equal amplitude but reversed in phase with respect to said second component. Thereafter a third time variable function is produced in response to said first and second functions which is proportional to a sum of said functions wherein said second function is spaced in time from the first function an interval equal to twice the time of travel of said second component from said point of detonation to said near surface interface.

For a more complete understanding of the present invention reference may now be had to the following description taken in conjunction with the accompanying drawings in which.

Figures 1, 4:
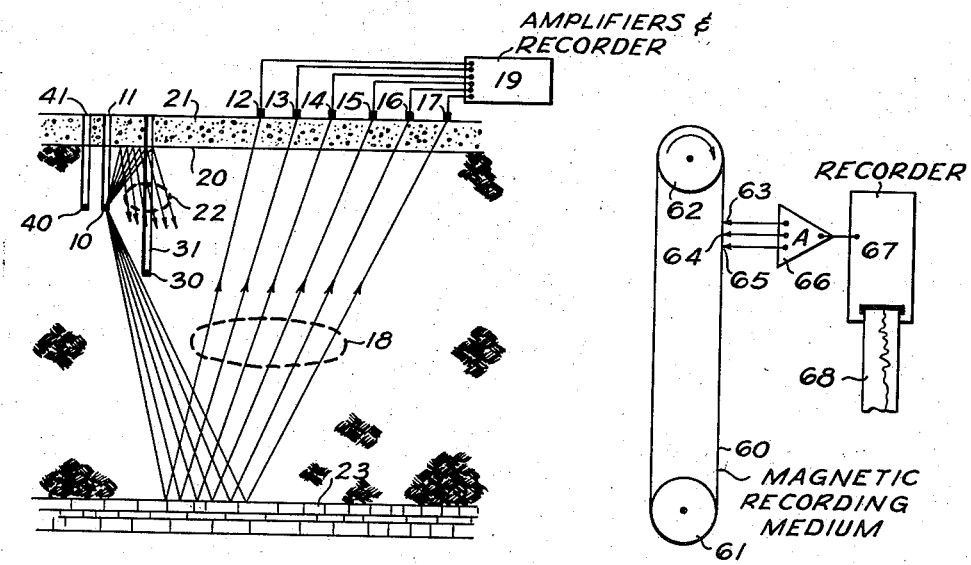
Fig. 1 illustrates a seismic exploration system for practicing the invention.
Fig. 4 illustrates the use of phonographically reproducible records in practicing the invention.

Referring first to Fig. 1, in accordance with general seismic procedures an explosive charge 10 positioned in bore hole 11 is detonated for the production of seismic waves which travel in all directions therefrom. A plurality of seismic detectors 12–17 are positioned on the earth's surface along a line radiating from shot hole 11 at uniform intervals for the reception of seismic energy traveling along paths indicated by the rays encircled by the dotted outline 18. As a result electrical signals, time variable functions, are generated by detectors 12–17 and applied to an amplifying-recording system generically represented by the block 19 for the production of seismic records of the type well known to those skilled in the art.

It has been found that the resulting seismogram may be unduly complicated by the presence of energy traveling upwardly from shot 10 and reflected from one or more interfaces above the point of detonation of the charge. In the general case, energy is reflected from the base 20 of weathered layer 21 since it is desirable to detonate the explosive charge 10 below the weathering. For the purpose of illustration, such energy has been represented as following the rays encircled by the dotted outline 22. The latter energy travels to a subsurface reflecting interface 23 and is there reflected back to the surface where it affects in a substantial manner the detectors 12–17. It is desirable to produce a wave pattern at detectors 12–17 that is as simple in its make-up as is possible and that has characteristics so dependent on the elastic properties of the beds adjoining the interface that it can be correlated with wave patterns from the same interface recorded from other shot holes in the vicinity. The complicated nature of the earth structure is sufficient often to render interpretation of the seismogram difficult but the presence of added energy such as reflected from the base 20 of the weathered layer serves only to further encumber interpretive efforts.

In referring to Fig. 2 there is illustrated a record of energy detected at a point below the seismic charge 10. More particularly, a detector 30 was lowered into a bore hole 31 adjacent bore hole 11 to a depth substantially below the explosive charge 10 so that both the direct traveling energy and the energy reflected from the interface 20 would be detected. While the character of the acoustic waves resulting from detonation of an explosive charge varies from area to area, the wave-form 32 may be taken as fairly representative of the phenomena to be expected. An abrupt onset 33 indicative of considerable high frequency energy is followed by a lower frequency decay pattern in the record interval 34. This wave-form represents the direct traveling energy traveling downward from explosive charge 10 immediately following its detonation. As is often the case, there is later observed a second wave 35 closely related in waveform to the wave 32 but is reversed in phase and is considerably attenuated or reduced in amplitude. The "attenuation" here considered may be considered as being the combined effect of absorption of energy along its travel path and loss of energy at the reflecting interface. The onset 36 is opposite in sense from the onset 33 but the character and period are similar. The wave 35 is readily attributed to a reflection from the base of a near surface reflecting interface such as at the base of the weathering, since it has been found to occur at the proper record time as deduced from careful measurement of the depth of the explosive charge 10, the depth of interface 20 and the depth of geophone 30.

In order to eliminate such unwanted energy and in accordance with the present invention, a second time variable function is produced which is identical with the first time variable function except it is reduced in amplitude in direct proportion to the attenuation and loss upon reflection of seismic waves traveling from the explosive charge 10 to interfere 20 and return. More particularly, a second explosive charge 40 is positioned in a second bore hole 41 which is closely adjacent bore hole 11. If desired, the second charge may be placed in the bore hole 11 a short distance above the charge 10. This second charge is detonated at a time following the detonation of charge 10 equal to the time necessary for a seismic pulse to travel from charge 10 to interface 20 and return. Charge 40 is graded in size to produce a pulse of lower amplitude so as to cancel the energy traveling along ray paths in the dotted outline 22. As a result the trace 32a is relatively quiescent following the exponential decay during the interval 34 so that insofar as the detectors 12–17 of Fig. 1 are concerned a relatively simple source apparently was utilized and the resultant record is free of such unwanted energy as would have been represented by the wave 35 of the original source signal. The waveform of the energy appearing at detector 30 as a result of detonation of charge 40 alone is recorded on the second trace 42 and is shown to duplicate the character of the wave-form 32 but is reduced in amplitude. It is also identical with the wave-form 35, having the same amplitude but reversed in sign so that the algebraic addition of the two wave-forms would produce zero signal during interval 43.

It should be recognized that energy traveling upward from explosive charge 40 will also contribute energy because of reflection from interface 20. This signal is illustrated in the record interval 44 and exhibits reduced amplitude compared with the wave-form 43 and is inverted in phase. Completely to eliminate the effect of interface 20 would require a series of explosive charges graded in size and detonated in time sequence for successive cancellation of the various reflections from the interface 20. In practice the energy level of the secondary reflection 44 is generally below the background noise level so that no more than two charges would be necessary in most practical cases. However in any case the charges may be provided in such number as to eliminate the effect of the presence of the weathering interface. Where there is more than one reflecting interface above the shot, one charge or group of charges may be employed to cancel the reflection from each interface following detonation of the initial charge.

Figure 3:
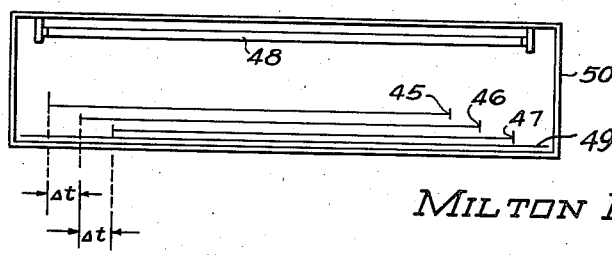
Fig. 3 illustrates a photographic process embodying the present invention.

In accordance with the foregoing discussion, the unwanted energy is eliminated by use of a plurality of explosive charges in the production of a primary seismic record. In accordance with another aspect of the invention and as illustrated in Fig. 3, a single explosive charge may be detonated to produce a photographically reproducible primary record, such as shown in Patent No. 2,144,812. A plurality of film negatives 45, 46 and 47 may then be made from the primary record and utilized to produce a record unmarred by the presence of reflections from a weathering interface. The records 45, 46 and 47 are identical with each other except graded in their intensities or in the contribution they make to the impediment of light from a source 48 passing therethrough. The grading of intensities is so regulated that the impediment of the light for the three records is in proportion to the respective amplitudes of the initial signal and the first and second reflections from interfaces above the shot. The records 45–47 are stacked one upon another over a sensitized film 49. The records are spaced along their time axes an interval $\Delta t$ one from another so that the total light passing to the sensitized film 49 will be proportionately attenuated. Films 45–47 and 49 along with the light source 48 are illustrated as enclosed within a light-tight housing 50 as is convenient in the production of secondary seismic records. The records 45–47 of the variable density type would thus cause film 49 to be exposed in the same manner as a film would be exposed by signals from geophones 12–17 in response to successive detonations of three graded charges. In the case of a reflection from the bottom of a layer having a speed higher than that of the material below it in which the charge is fired, the phase will not be reversed and cancellation of the reflected signal may be obtained by electrical reversal of the phase of the initial signal during the process of reproducing it as an attenuated variable-density film trace.

In accordance with a further aspect of the invention, a record impressed upon a magnetic recording medium 60 (as for example in manner shown in Patents 2,144,812 and 2,427,421, Rieber) resulting from the detonation of a single explosive charge and the detection of such energy by geophones 12–17 is detected as the recording medium is rotated over pulleys 61 and 62. More particularly, detecting heads 63, 64 and 65 are spaced along the magnetic recording element 60 to reproduce from each said geophone the signal impressed thereon as three spaced time variable functions. The signals are applied to an amplifier 66 which preferably has individual volume attenuators for each of the channels from detectors 63–65. The attenuators may then be adjusted to grade the intensity of the signals in proportion to the attenuation of energy traveling from the location of the shot utilized to its adjacent weathering interface or other reflecting interface above the shot and return. The detectors 63–65 are spaced one from another in proportion to the travel time of such energy traveling from the shot point to the associated weathering interface. The signals after selective attenuation are then combined in amplifier 66 and the resultant signal is then impressed upon recorder 67 for the production of a record 68 which then has the same character as would be produced by the above-described successive detonation of plural charges. Here also the signal reflected downward from the base of any high-speed layer above the shot, which will not be reversed upon reflection, may be cancelled by electrical phase reversal of the signals produced by detectors 63 and 65 or by reversal of the phase of the signal produced by detector 64.

From the foregoing description it will be seen that the present invention comprises a method and apparatus for eliminating certain unwanted components of energy from seismic records. A first time variable function is produced which is representative of seismic waves generated at a shot point below the weathered layer interface. A second time variable function is produced which is identical with the first function except graded or reduced in amplitude in direct proportion to the attenuation of energy traveling from the shot point to the weathered layer interface and back to the point of detonation and when necessary reversed in phase with respect to the first function. The time variable functions are then combined and spaced along a time scale from one another by an interval equal to twice the time of travel of an acoustic pulse from the shot point to the interface. The combined functions may then be recorded for the production of a seismogram inherently of more simple and uniform character than is produced by conventional procedures and thus more readily susceptible of interpretation.

While the method of the present invention as above described may be practiced by detonating a plurality of explosive charges in a predetermined time relation one to another to composite the resultant waves, it should here be noted that the plurality of charges need not be detonated as a related series to effect the same primary record. On the contrary, they may be detonated separately and the separate records thus produced may be utilized in the manner discussed in connection with Fig. 3 for the production of a composite record.

In connection with Fig. 4 a plurality of detecting heads were spaced along the length of the recording medium, but it will be apparent that a single detecting head may be utilized to feed a plurality of time-delay circuits in which the signals are delayed and then recombined in a time relation the same as would be produced when separated in the manner discussed.

Figure 2:
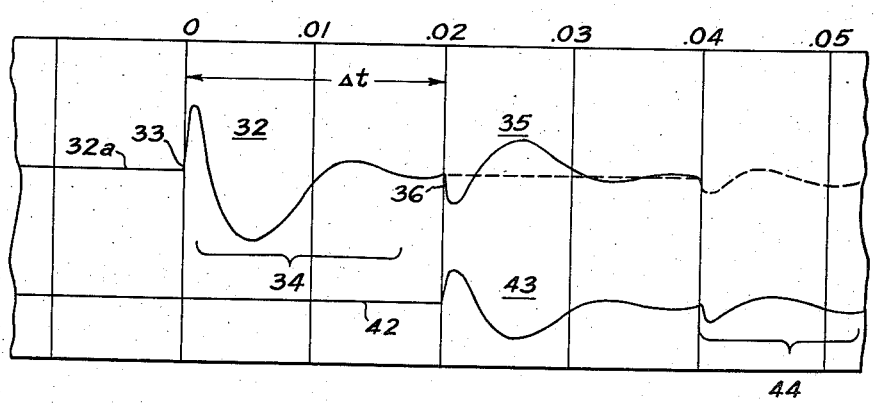
Fig. 2 is an enlarged view of a record of waves recorded closely adjacent the point of detonation of an explosive charge.

It will be appreciated that the wave-forms illustrated in Fig. 2 have been idealized for the purpose of the present description and that the form of the waves actually detected by a geophone in the position of detector 30, Fig. 2, may differ substantially from those illustrated. However in so far as the low frequency components, those of importance in seismic exploration, are concerned, the identity depicted in Fig. 2 actually exists. Further it will be apparent that the invention applies equally to the elimination of the problem present by reason of either a single near surface reflector or a plurality of near surface, near shot reflecting interfaces. While specific systems and procedures have been illustrated and described, it will now be apparent that further modifications may be adopted and it is intended to cover all such modifications as fall within the scope of the appended claims.

What is claimed is:

1. In seismic exploration, the method of reducing the effects in a seismogram of variables due to the combination with a first energy component traveling downward as a first time variable function from a point of generation of seismic waves to a subterranean reflecting interface of a second energy component reflected downwardly to said subterranean interface from a near surface reflecting interface, which comprises producing a second time variable function substantially identical with said first time variable function and time spaced from said first function by an interval equal to twice the time of travel of an acoustic pulse from said point of generation to said near surface interface, the phase of said second function being reversed relative to that of the time variable function of said downwardly reflected second component, said second time function having an amplitude reduced relative to that of said first time function in direct proportion to the attenuation of said second component in traveling from said point of generation to said near surface interface and back to said point, and producing along a time scale a third time variable function proportional to the instantaneous sums of said first and said second time functions.

2. The method of reducing shot point variables in seismic exploration which comprises producing a first time variable function representative of seismic waves appearing at the earth's surface due to the combination of a first energy component traveling downward from the point of detonation of an explosive charge to a subterranean reflecting interface and a second energy component reflected downwardly to said subterranean interface from a near surface reflecting interface, producing a second time variable function substantially identical with said first time variable function except reversed in phase with respect to said second component and reduced in amplitude in direct proportion to the attenuation of said second component in traveling from said point of detonation to said near surface interface and back to said point of detonation, combining said time variable functions while spaced along a time scale from one another an interval equal to the time of travel of an acoustic pulse from said point of detonation to said near surface interface and back to said point of detonation, and recording the combined functions.

3. The method of reducing shot point variables in seismic exploration which comprises producing a first phonographically reproducible time variable function representative of seismic waves appearing at the earth's surface due to the combination of a first energy component traveling downward from the point of detonation of an explosive charge to a subterranean reflecting interface and a second energy component reflected downwardly to said subterranean interface from a near surface reflecting interface, producing a second phonographically reproducible time variable function identical with said second component of said first time variable function except reversed in phase, combining said first and second time variable functions while spaced along a time scale from one another an interval equal to twice the time of travel of an acoustic pulse from said point of detonation to said near surface interface, and recording the combined functions.

4. The method of reducing shot point variables in seismic exploration which comprises detonating an explosive charge at a point in the earth below the base of a low velocity surface layer, detonating a second explosive charge substantially at said point spaced a time interval from said first charge equal to twice the travel time of an acoustic pulse from the point of detonation to said base, said second charge being smaller than said first charge by an amount related to the magnitude of the attenuation of seismic energy traveling from said point of detonation to said base and back to said point of detonation, the phase of the seismic wave generated by said second charge being reversed relative to the seismic wave generated by said first charge and reflected downwardly from said base, at points spaced laterally from said point of detonation detecting the algebraic sum of said seismic waves produced by detonation of both of said charges, and recording said detected waves.

5. The method of reducing shot point variables in seismic exploration which comprises producing a first time variable function representative of seismic waves generated at a shot point below a reflecting interface in the earth, producing a second time variable function identical with the first time variable function except reduced in amplitude in direct proportion to the attenuation of seismic waves traveling from said shot point to said interface and return, combining said time variable functions while spaced along a time scale from one another an interval equal to twice the time of travel of an acoustic pulse from said shot point to said interface, and recording the combined functions.

6. The method of reducing shot point variables in seismic exploration which comprises generating a first signal representative of seismic waves produced at a shot point in the earth, generating a second signal delayed a time interval equal to twice the travel time of a pulse from the point of generation of said first signal to the base of the weathered layer and reduced in amplitude in proportion to the attenuation of said first signal traveling from said shot point to said interface and back to said shot point, combining said first and second signals for cancellation of energy reflected from said interface, and recording the sum of said waves.

7. A seismic exploring system which comprises means for producing a first time variable function representative of seismic waves produced upon detonation of an explosive charge in the earth below a reflecting interface, means for producing a second time variable function identical with said first time variable function but reduced in amplitude in direct proportion to the attenuation of seismic waves traveling from the point of detonation of said explosive charge to said interface and back to said point of detonation, means for combining said time variable functions while spaced along a time scale from one another an interval equal to the time of travel of said seismic waves from said charge to said interface and back to the location of said charge, and means for recording the combined time variable functions.

8. A seismic exploring system which comprises means for producing a first photographically reproducible time variable function representative of seismic waves produced upon detonation of an explosive charge in the earth below a reflecting interface, means for producing a second photographically reproducible time variable function identical with said first time variable function but reduced in magnitude in direct proportion to the attenuation of seismic waves traveling from the point of detonation of said explosive charge to said interface and back to said point of detonation, means for algebraically adding said time variable functions while spaced along a time scale from one another an interval equal to twice the time of travel of said seismic waves from said charge to said interface, and photo-sensitive means for recording the time variable function resulting from said addition of said functions.

9. A seismic exploring system which comprises means for producing a first phonographically reproducible time variable function representative of seismic waves produced upon detonation of an explosive charge in the earth below a reflecting interface, means for producing a second phonographically reproducible time variable function identical with said first time variable function but reduced in amplitude in direct proportion to the attenuation of seismic waves traveling from the point of detonation of said explosive charge to said interface and back to said point of detonation, means for combining said time variable functions while spaced along a time scale from one another an interval equal to twice the time of travel of said seismic waves from said charge to said interface, and means for recording the combined time variable functions.

10. In a seismic exploring system, the combination which comprises an explosive charge positioned in the earth below the base of a low velocity near surface layer, means for detonating said charge, a second explosive charge closely adjacent said first charge and graded in size with respect to said first charge in proportion to the attenuation of seismic waves traveling from said first charge to said base and back to said first charge, means for detonating said second charge a time interval after detonation of said first charge equal to twice the time of travel of said seismic waves from said first charge to said base, the phase of the seismic wave generated by said second charge being reversed relative to the seismic wave generated by said first charge and reflected downwardly from said base, and means including a plurality of detectors at the earth's surface responsive to the algebraic sum of said seismic waves for producing a time-variable record of their said sum.

11. The method of reducing shot point variables in seismic exploration which comprises producing a first time variable function representative of seismic waves appearing at the earth's surface due to the combination of a first energy component traveling downward from the point of detonation of an explosive charge to a subterranean reflecting interface and a second energy component reflected downwardly to said subterranean interface from a near surface reflecting interface, producing a second time variable function of amplitude equal to said second energy component and spaced from the first function an interval equal to twice the time of travel of said second component from said point of detonation to said near surface interface, the phase of said second function being reversed with respect to that of said second energy component, and adding said first function and said second function to eliminate the effect of said second energy component.

References Cited in the file of this patent

UNITED STATES PATENTS

| | | |
|---|---|---|
| 2,087,702 | Peters | July 20, 1937 |
| 2,144,812 | Rieber | Jan. 24, 1939 |
| 2,156,198 | Scherbatskoy | Apr. 25, 1939 |
| 2,243,729 | Ellis | May 27, 1941 |
| 2,275,735 | Cloud | Mar. 10, 1942 |
| 2,427,421 | Rieber | Sept. 16, 1947 |
| 2,628,689 | Rieber | Feb. 17, 1953 |